(12) United States Patent
Grigorov et al.

(10) Patent No.: US 10,301,963 B2
(45) Date of Patent: May 28, 2019

(54) STARTER AIR VALVE SYSTEMS CONFIGURED FOR LOW SPEED MOTORING

(71) Applicant: Hamilton Sundstrand Corporation, Charlotte, NC (US)

(72) Inventors: Boris N. Grigorov, Granby, CT (US); Tyler J. Selstad, West Hartford, CT (US); Leo J. Veilleux, Jr., Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/392,788

(22) Filed: Dec. 28, 2016

(65) Prior Publication Data

US 2018/0179911 A1 Jun. 28, 2018

(51) Int. Cl.

| | |
|---|---|
| *F01D 19/00* | (2006.01) |
| *F16K 37/00* | (2006.01) |
| *F16K 31/42* | (2006.01) |
| *G05D 7/06* | (2006.01) |
| *F01D 17/06* | (2006.01) |
| *F01D 19/02* | (2006.01) |
| *F02C 7/277* | (2006.01) |

(52) U.S. Cl.
CPC ............. *F01D 19/00* (2013.01); *F01D 17/06* (2013.01); *F01D 19/02* (2013.01); *F02C 7/277* (2013.01); *F16K 31/42* (2013.01); *F16K 37/0008* (2013.01); *G05D 7/0641* (2013.01); *F05D 2260/60* (2013.01); *F05D 2270/30* (2013.01); *F05D 2270/304* (2013.01); *F05D 2270/62* (2013.01); *F05D 2270/70* (2013.01)

(58) Field of Classification Search
None
See application file for complete search history.

(56) References Cited

U.S. PATENT DOCUMENTS

| | | | | |
|---|---|---|---|---|
| 4,702,273 | A | * 10/1987 | Allen, Jr. ................ | F02C 7/277 |
| | | | | 123/179.31 |
| 5,435,125 | A | * 7/1995 | Telakowski ............. | F02C 7/277 |
| | | | | 60/625 |

(Continued)

OTHER PUBLICATIONS

Extended European Search Report, of the European Patent Office, dated May 30, 2018, issued in corresponding European Patent Application No. 17210816.9.

*Primary Examiner* — John Fox
(74) *Attorney, Agent, or Firm* — Locke Lord LLP; Scott D. Wofsy; Daniel J. Fiorello

(57) ABSTRACT

A starter air valve (SAV) system includes a pressure actuated SAV actuator configured to be operatively connected to a SAV, a first pressure valve configured to selectively allow pressure from a pressure source to the SAV actuator when in fluid communication with the SAV actuator, and a second pressure valve configured to selectively allow pressure from the pressure source to the SAV actuator when in fluid communication with the SAV actuator. A manual override (MOR) valve selector is disposed between the first pressure valve, the second pressure valve, and the SAV actuator, the MOR valve selector configured to selectively fluidly connect the first pressure valve and the SAV actuator in a first position and to fluidly connect the second pressure valve and the SAV actuator in a second position.

11 Claims, 2 Drawing Sheets

(56) References Cited

U.S. PATENT DOCUMENTS

| | | | | |
|---|---|---|---|---|
| 5,499,651 | A * | 3/1996 | Gallo | F01D 25/02 |
| | | | | 137/334 |
| 6,694,746 | B2 * | 2/2004 | Reed | F02C 7/047 |
| | | | | 137/488 |
| 7,066,710 | B2 * | 6/2006 | Wiggins | F16K 31/1635 |
| | | | | 137/488 |
| 8,286,661 | B2 * | 10/2012 | Krake | F16K 31/1245 |
| | | | | 137/487 |
| 8,800,593 | B2 * | 8/2014 | Sakasegawa | G01F 1/684 |
| | | | | 137/486 |
| 2005/0276685 | A1 * | 12/2005 | Wiggins | F01D 17/145 |
| | | | | 415/151 |
| 2010/0085676 | A1 | 4/2010 | Wilfert | |
| 2014/0373518 | A1 * | 12/2014 | Manneville | F01D 19/02 |
| | | | | 60/327 |
| 2014/0373553 | A1 * | 12/2014 | Zaccaria | F02C 7/277 |
| | | | | 60/778 |
| 2017/0234236 | A1 * | 8/2017 | Feulner | F02C 7/277 |
| | | | | 60/778 |
| 2017/0356457 | A1 * | 12/2017 | Rasmussen | F04D 29/582 |
| 2018/0016988 | A1 * | 1/2018 | Short | F02C 7/277 |

\* cited by examiner

STARTER AIR VALVE SYSTEMS CONFIGURED FOR LOW SPEED MOTORING

BACKGROUND

1. Field

The present disclosure relates to turbomachine starter air valves, more specifically to starter air valve systems for low speed motoring.

2. Description of Related Art

Turbomachine engines are becoming progressively smaller and operate hotter. Upon engine shut down, due to uneven rate of cooling at its top and bottom the bowed rotor phenomenon occurs. If start is attempted during this condition, blade rub occurs. One potential solution is to motor the engine (to rotate the engine without turning it on) prior to start in order to reverse the bow.

The engine should be motored within a narrow band of very low speeds in order to cool down. This is, because at higher revolutions an engine rub will occur, while dwelling at lower speeds than recommended, a resonance leading to catastrophic failure develops. Motoring is done using air flow from the Auxiliary Power Unit (APU) to the engine starter which in turn rotates the engine. Given the above constraints, air flow must be controlled by a valve to control the flow from the APU at starter valve. The problem with the current systems and the air valves that are being used is that they are not designed to motor the engine at low speeds (e.g., an APU starter is inherently designed to speed the engine up to operational speed).

Conventional methods and systems have generally been considered satisfactory for their intended purpose. However, there is still a need in the art for improved starter air valve systems. The present disclosure provides a solution for this need.

SUMMARY

In accordance with at least one aspect of this disclosure, a starter air valve (SAV) system includes a pressure actuated SAV actuator configured to be operatively connected to a SAV, a first pressure valve configured to selectively allow pressure from a pressure source to the SAV actuator when in fluid communication with the SAV actuator, and a second pressure valve configured to selectively allow pressure from the pressure source to the SAV actuator when in fluid communication with the SAV actuator. A manual override (MOR) valve selector is disposed between the first pressure valve, the second pressure valve, and the SAV actuator, the MOR valve selector configured to selectively fluidly connect the first pressure valve and the SAV actuator in a first position and to fluidly connect the second pressure valve and the SAV actuator in a second position.

In certain embodiments, at least one of the first pressure valve or second pressure valve can be a pulse-width modulation solenoid valve configured to provide a duty cycle of pressure from the pressure source to the SAV actuator when in fluid communication with the SAV actuator. The SAV can include at least one of a butterfly valve or an inline valve valve or any other suitable valve.

The first pressure valve can be operatively connected to a first controller to control the first pressure valve. The first controller can be an engine computer, for example.

In certain embodiments, the second pressure valve can be operatively connected to a second controller to control the second pressure valve. The second controller can include a secondary power source configure to be switched on when the MOR valve selector is in the second position.

The second controller can include a control module operatively connected to the second pressure valve. The second controller can include a speed sensor operatively connected to the control module and configured to sense an engine speed for providing speed data to the control module.

In certain embodiments, the system can include a manual selector for indicating which position the MOR valve selector is in. For example, a normal start indication can correspond to the first position and a BRS MOR indication can correspond to the second position. The system can include the pressure source operatively connected to the first pressure valve and the second pressure valve.

In accordance with at least one aspect of this disclosure, a starter air valve (SAV) system includes a pressure actuated SAV actuator configured to be operatively connected to a SAV and a first pressure valve configured to selectively allow pressure from a pressure source to the SAV actuator when in fluid communication with the SAV actuator. The first pressure is a pulse-width modulation solenoid valve configured to provide a duty cycle of pressure from the pressure source to the SAV actuator.

In accordance with at least one aspect of this disclosure, a method includes pulse width modulating a first pressure valve to provide a duty cycle of pressure to a starter air valve actuator based on an engine speed to actuate a starter air valve (SAV) to motor an engine at a predetermined motoring speed. The method can include selecting a second pressure valve to provide the duty cycle of pressure to SAV actuator based on the engine speed to actuate a starter air valve (SAV) to motor an engine at a predetermined motoring speed. Selecting the second pressure valve can include using a manual override (MOR) valve selector.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
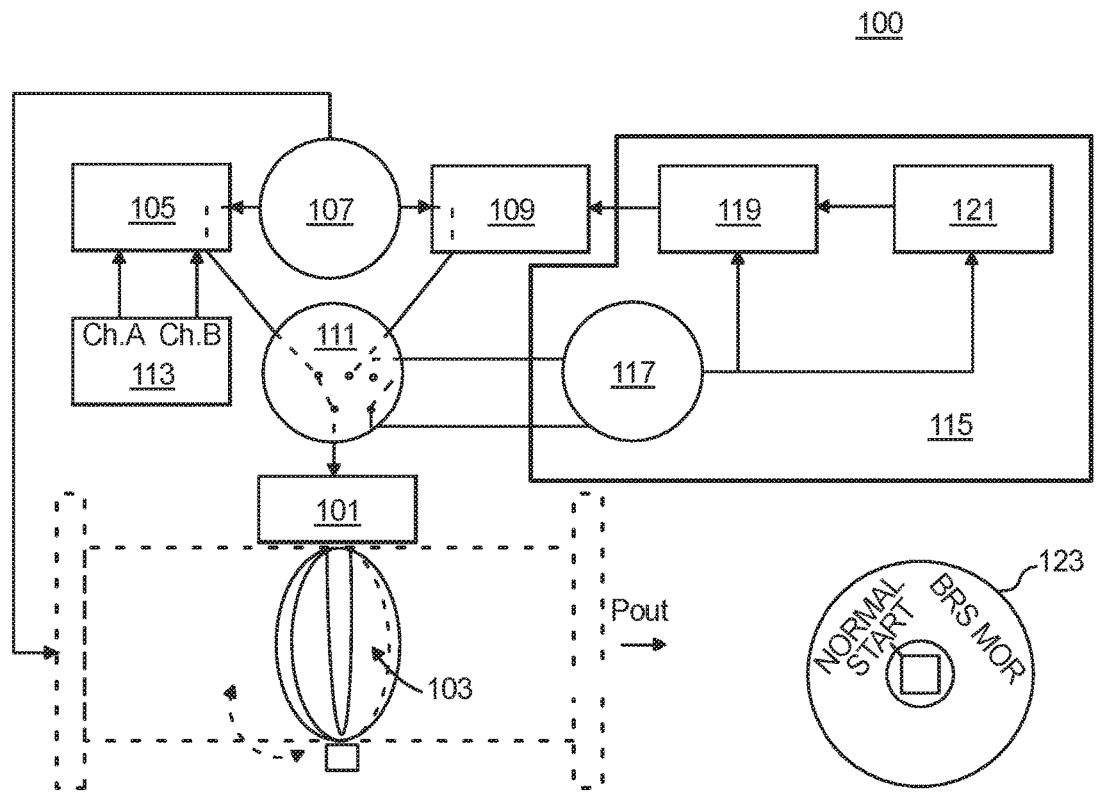
FIG. 1 is a schematic view of an embodiment of a system in accordance with this disclosure, showing a manual override (MOR) valve selector in a first (e.g., normal operating) position.
Figure 2:
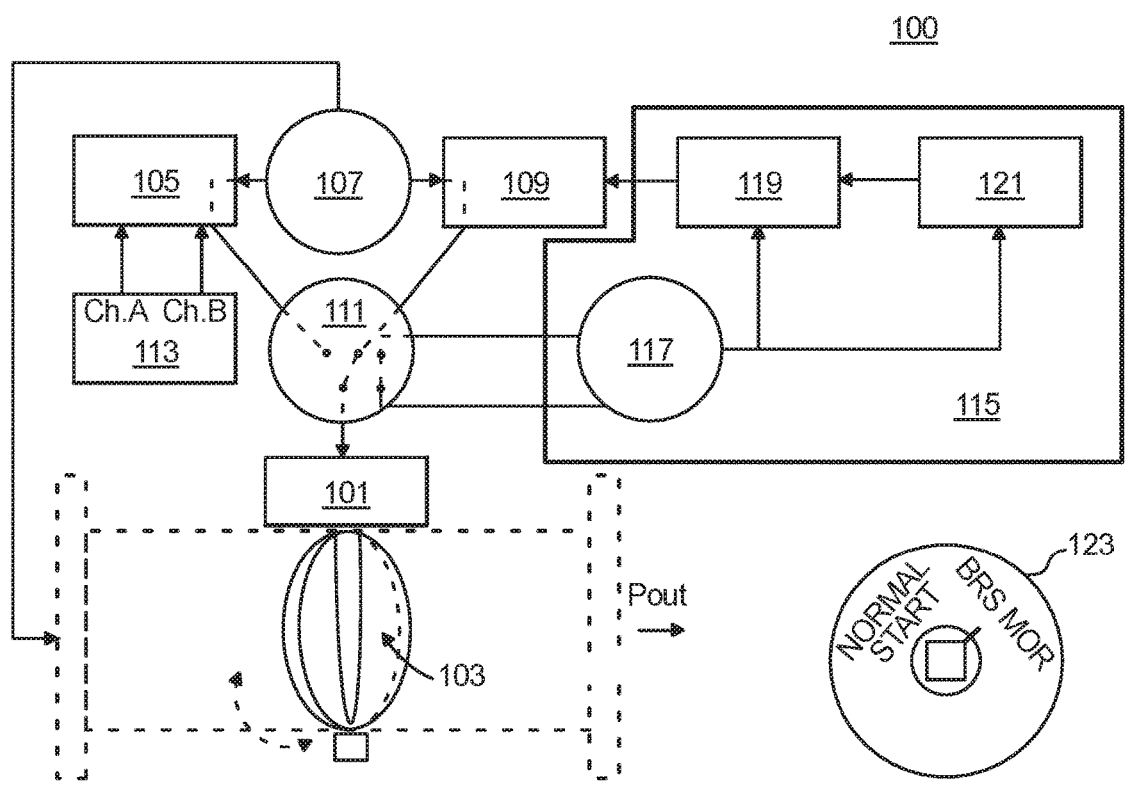
FIG. 2 is a schematic view of the system of FIG. 1, showing the MOR valve selector in a second (e.g., manual override) position.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. The systems and methods described herein can be used to allow controlled low speed engine motoring and redundant starter air valve control.

Referring to FIGS. 1 and 2, a starter air valve (SAV) system 100 (e.g., for an aircraft turbomachine) includes a pressure actuated SAV actuator 101 configured to be operatively connected to a SAV 103. As shown, the SAV can include at least one of a butterfly valve or an inline valve valve, for example, or any other suitable valve.

A first pressure valve 105 is configured to selectively allow pressure from a pressure source 107 to the SAV actuator 101 when in fluid communication with the SAV actuator 101. The system 100 can also include a second pressure valve 109 configured to selectively allow pressure from the pressure source 107 to the SAV actuator 101 when in fluid communication with the SAV actuator 101.

A manual override (MOR) valve selector 111 can be disposed between the first pressure valve 105, the second pressure valve 109, and the SAV actuator 101. The MOR valve selector 111 is configured to selectively fluidly connect the first pressure valve 105 and the SAV actuator 101 in a first position (e.g. as shown in FIG. 1) and to fluidly connect the second pressure valve 109 and the SAV actuator 101 in a second position (e.g., as shown in FIG. 2).

In certain embodiments, at least one of the first pressure valve 105 or second pressure valve 109 can be a pulse-width modulation solenoid valve configured to provide a duty cycle of pressure from the pressure source 107 to the SAV actuator 101 when in fluid communication with the SAV actuator 101. In this regard, the first pressure valve 105 and/or second pressure valve 109 can allow intermittent pressure of any suitable interval and/or duty cycle of said intervals to reach the SAV actuator 101 which ultimately gates the amount of flow allowed through the SAV 103.

In certain embodiments, the first pressure valve 105 can be operatively connected to a first controller 113 to control the first pressure valve 105. The first controller 113 can be an engine computer (e.g., an EEC), for example. The first controller 113 can also connect to and/or otherwise control the second pressure valve 109 in certain embodiments. The first controller 113 can be operatively associated with one or more sensors associated with an engine (e.g., speed sensors) to control the first pressure valve 105 and/or the second pressure valve 109.

In certain embodiments, the second pressure valve 109 can be operatively connected to a second controller 115 to control the second pressure valve 109 in addition to or separate from the first controller 113. The second controller 115 can include a secondary power source 117 configured to be switched on when the MOR valve selector 111 is in the second position (e.g., as shown in FIG. 2). In certain embodiments, the second pressure valve 109 might be mounted in a remote location (e.g., in an aircraft cockpit, on engine casing), for example, or any other suitable location.

The second controller 115 can include a control module 119 operatively connected to the second pressure valve 109. The second controller 115 can include a speed sensor 121 operatively connected to the control module 119 and configured to sense an engine speed for providing speed data to the control module 119, for example. The control module 119 can be connected to any other suitable sensor. The second controller 115 can be configured to pulse-width modulate the second pressure valve 109 to provide a pulsed pressure signal to the SAV actuator 101 in the second position with the purpose of motoring the engine at a predetermined time followed by a full start.

In certain embodiments, the system 100 can include a manual selector 123 for indicating which position the MOR valve selector 111 is in. For example, a normal start indication can correspond to the first position (e.g., as in FIG. 1) and a BRS MOR indication can correspond to the second position (e.g., as in FIG. 2).

The system 100 can include the pressure source 107 operatively connected to the first pressure valve 105 and the second pressure valve 109. In certain embodiments, the pressure source 107 supplied to the first pressure valve 105 can be different from a pressure source providing a pressure to be controlled by the SAV actuator.

In accordance with at least one aspect of this disclosure, a starter air valve (SAV) system 100 includes a pressure actuated SAV actuator 101 configured to be operatively connected to a SAV 103 and the first pressure valve 105 that is a pulse-width modulation solenoid valve configured to provide a duty cycle of pressure from the pressure source to the SAV actuator 101, without a the MOR valve selector 111 and/or a second pressure valve 109.

In accordance with at least one aspect of this disclosure, a method includes pulse width modulating a first pressure valve to provide a duty cycle of pressure to a starter air valve actuator based on an engine speed to actuate a starter air valve (SAV) to motor an engine at a predetermined motoring speed. The method can include selecting a second pressure valve to provide the duty cycle of pressure to SAV actuator based on the engine speed to actuate a starter air valve (SAV) to motor an engine at a predetermined motoring speed. Selecting the second pressure valve can include using a manual override (MOR) valve selector.

Certain embodiments of the method do not take inputs from the engine computer in order to determine optimum motoring time. Certain embodiments include motoring the engine at a predetermined time interval which can be derived based on the worst motoring condition for the particular engine corresponding to maximum motor time.

As described above, during normal operation the engine completes a motoring sequence leading to start. The pressure valve solenoid is pulse width modulated by the first controller 113 (e.g., an EEC with an input from the engine N2 sensor). The MOR valve selector 111 blocks (e.g., mechanically) the duct connecting the MOR valve selector 111 to the SAV actuator 101. In certain embodiments, it also disengages the circuit switching the power to the controller 115, for example.

During a failure condition, the MOR valve selector can be utilized. The closed loop control can be achieved with inputs from the speed sensor 121 (e.g., mounted on the accessory gearbox crankshaft). Prior to start, a technician can set the system to BRS MOR position as shown in FIG. 2. This blocks the duct connecting first pressure valve 105 to the SAV actuator 101 and closes the circuit that switches power to the controller 115, for example. During the motoring sequence the second pressure valve 109 can be pulse width modulated. To avoid human error, the motoring sequence can equal the maximum specified per the requirements for the particular engine after which the second pressure valve 109 is commanded open by the second controller 115 (or first controller 113) and full start sequence is completed.

In certain embodiments, the SAV can include a fitting allowing a user to manually unstuck the SAV due to an obstruct by manually turning the SAV. In a condition where the SAV is stuck closed due to obstruction, the pressure source (i.e. APU, ground cart, etc.) and any functions that may lead to engine turning are switched off. The nacelle can be opened and the SAV can be accessed via a fitting (e.g., on the butterfly shaft) that would allow a technician to turn the mechanism manually and unstuck the SAV.

Embodiments as described above utilize a pulse-width capable solenoid controlled by a circuit card or other suitable controller with inputs from a speed sensor (e.g., mounted on the accessory gearbox crank pad). Certain embodiments also include a MOR valve selector. Embodiments solve the problems of pressure valve solenoid electrical failure, pressure valve solenoid-EEC link failure, pressure valve solenoid mechanically being stuck closed or open, and sluggish SAV, for example. Embodiments prevent over speeding during motoring and prevent a bowed rotor from causing rubbing.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

The methods and systems of the present disclosure, as described above and shown in the drawings, provide for SAV systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A starter air valve (SAV) system comprising:
a pressure actuated SAV actuator configured to be operatively connected to a SAV; and
a first pressure valve configured to selectively allow pressure from a pressure source to the SAV actuator;
a second pressure valve configured to selectively allow pressure from the pressure source to the SAV actuator; and
a manual override (MOR) valve selector disposed between the first pressure valve, the second pressure valve, and the SAV actuator, the MOR valve selector configured to selectively fluidly connect the first pressure valve and the SAV actuator in a first position and to fluidly connect the second pressure valve and the SAV actuator in a second position.

2. The system of claim 1, wherein at least one of the first pressure valve or second pressure valve is a pulse-width modulation solenoid valve configured to provide a duty cycle of pressure from the pressure source to the SAV actuator.

3. The system of claim 1, wherein the SAV includes at least one of a butterfly valve or an inline valve.

4. The system of claim 3, further comprising a second controller in operable communication with at least the second pressure valve and configured to control the second pressure valve.

5. The system of claim 4, wherein the second controller includes a secondary power source configure to be switched on when the MOR valve selector is in the second position.

6. The system of claim 5, wherein the second controller includes a control module operatively connected to the second pressure valve.

7. The system of claim 6, wherein the second controller includes a speed sensor operatively connected to the control module and configured to sense an engine speed for providing speed data to the control module.

8. The system of claim 1, further comprising a first controller in operable communication with at least the first pressure valve and configured to control the first pressure valve.

9. The system of claim 8, wherein the first controller is an engine computer.

10. The system of claim 1, further comprising a manual selector for indicating which position the MOR valve selector is in, wherein a normal start indication corresponds to the first position and a BRS MOR indication corresponds to the second position.

11. The system of claim 1, further comprising the pressure source operatively connected to the first pressure valve and the second pressure valve.

* * * * *